United States Patent
Ooi et al.

(10) Patent No.: US 6,735,054 B2
(45) Date of Patent: May 11, 2004

(54) LOW COST OVERMOLDED MAGNET AND POLE ASSEMBLY

(75) Inventors: Tak Koon Ooi, Singapore (SG); Jierapipatanakul Niroot, Singapore (SG); Wai Onn Chee, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 27 days.

(21) Appl. No.: 09/885,384

(22) Filed: Jun. 20, 2001

(65) Prior Publication Data

US 2002/0015263 A1 Feb. 7, 2002

Related U.S. Application Data

(60) Provisional application No. 60/222,992, filed on Aug. 4, 2000.

(51) Int. Cl.[7] .................................................. G11B 5/55
(52) U.S. Cl. .................................................. 360/264.9
(58) Field of Search ...................... 360/264.9, 97.01, 360/265.7, 256, 254.3, 264.7, 254.4, 254.5, 254.6, 255, 266.8; 369/13.17

(56) References Cited

U.S. PATENT DOCUMENTS

| | | | |
|---|---|---|---|
| 4,700,246 A | | 10/1987 | Luoma et al. |
| 4,730,299 A | * | 3/1988 | Kamoshita et al. ......... 369/264 |
| 5,223,681 A | * | 6/1993 | Buehler et al. .............. 218/22 |
| 5,532,891 A | | 7/1996 | Tsujino |
| 5,543,676 A | | 8/1996 | York et al. |
| 5,581,422 A | * | 12/1996 | Umehara ................. 360/97.01 |
| 5,585,679 A | * | 12/1996 | Bracken et al. .............. 310/13 |
| 5,621,591 A | * | 4/1997 | Rahimi et al. ............... 360/265 |
| 5,650,896 A | * | 7/1997 | Viskochil ................. 360/265.7 |
| 5,659,215 A | * | 8/1997 | Dunfield et al. ....... 310/154.21 |
| 5,694,268 A | * | 12/1997 | Dunfield et al. ....... 324/207.25 |
| 5,731,934 A | | 3/1998 | Brooks et al. |
| 5,757,588 A | | 5/1998 | Larson |
| 5,768,050 A | | 6/1998 | Cho |
| 5,825,592 A | * | 10/1998 | Takahashi ............... 369/13.17 |
| 5,831,795 A | * | 11/1998 | Ma et al. ................ 360/254.3 |
| 5,862,020 A | * | 1/1999 | Lee ......................... 360/264.7 |
| 5,983,485 A | * | 11/1999 | Misso ....................... 29/603.03 |
| 6,061,206 A | * | 5/2000 | Foisy et al. .............. 360/265.7 |
| 6,108,162 A | * | 8/2000 | Amirkiai et al. ......... 360/97.01 |
| 6,151,198 A | | 11/2000 | Prater et al. |
| 6,172,855 B1 | * | 1/2001 | Kim ........................... 360/256 |
| 6,185,074 B1 | * | 2/2001 | Wang et al. .............. 360/256.4 |
| 6,445,548 B1 | * | 9/2002 | Sasaki et al. ............ 360/256.2 |
| 6,489,761 B1 | * | 12/2002 | Schroeder et al. ..... 324/207.25 |

FOREIGN PATENT DOCUMENTS

WO    WO 96/04656 A1    2/1996

\* cited by examiner

*Primary Examiner*—Brian E. Miller
*Assistant Examiner*—Minh Le
(74) *Attorney, Agent, or Firm*—Derek J. Berger

(57) ABSTRACT

The present invention relates to a low cost voice coil motor for use in a disc drive. In accordance with one embodiment of the invention, the voice coil motor includes at least one overmold encapsulating an assembly of a magnet and a pole. The overmold thus provides a barrier against outgassing and corrosion.

21 Claims, 4 Drawing Sheets

LOW COST OVERMOLDED MAGNET AND POLE ASSEMBLY

RELATED APPLICATIONS

This application claims the benefit of U.S. Provisional Application No. 60/222,992, filed Aug. 4, 2000.

FIELD OF THE INVENTION

The present invention relates generally to disc drives. More particularly, the present invention relates to a low cost voice coil motor for use in a disc drive.

BACKGROUND OF THE INVENTION

Disc drives are used extensively for data storage in various applications. A typical disc drive includes discs on which data is written and heads to read data from and to write data to the discs. The heads are supported by an actuator assembly which allows the heads to be positioned at the desired locations relative to the data tracks on the discs.

Rotational movement of the actuator assembly is generally enabled by a voice coil motor. The voice coil motor is basically made up of a magnet fixed relative to the disc drive housing and a voice coil fixed relative to the actuator assembly. By providing an electric current through the voice coil, a force is exerted on the voice coil, causing the actuator assembly to rotate about a pivot. Pole plates are provided to maximize the magnetic field in the vicinity of the voice coil so as to improve the performance of the voice coil motor.

One important consideration in the production of disc drives is the need to reduce particulate contamination within the disc drive. Particulate contamination in a disc drive must be kept low in order to prevent physical damage to the heads as well as to the discs. Disc drives are required to operate with increasing precision, following the increase in the data densities. Not only are the heads being placed in increasing proximity to the disc surface, the number of data tracks per inch on the discs is also increasing significantly. This increased precision means that particulate contamination in the disc drive must be closely controlled, as the damage caused by contaminants is becoming correspondingly serious. For example, particulate buildup between the head and the disc can cause degradation in the readback signal, head crashes and damage to the disc surface.

The various components must therefore be designed with care so as to avoid the use of materials likely to contribute to particulate contamination. Pole plates are one potential source of particulate contamination, as they are known to outgas when they reach high temperatures. For this reason, pole plates are often coated with a nickel plating, using nickel with high potassium, to prevent the pole plates from outgassing and contaminating the interior environment of the disc drive. Although nickel plating is effective in reducing outgassing, it is a relatively expensive process.

A further potential source of contaminants is the adhesive typically used to mount the magnet to the pole plate. While adhesives are effective in rigidly securing the magnet to the pole plate, they are also prone to outgassing when subjected to the heat typically generated within a disc drive during operation.

What the prior art has been lacking is an easily assembled, low cost voice coil motor which is resistant to outgassing.

SUMMARY OF THE INVENTION

The present invention relates to a voice coil motor for a disc drive suitable for low cost production. In accordance with one embodiment of the invention, the voice coil motor includes an overmold encapsulating a voice coil motor assembly including a magnet and a pole. The overmold prevents outgassing by the pole and magnet.

These and other features and benefits will become apparent upon a review of the attached figures and the accompanying description.

DETAILED DESCRIPTION

Figure 1:
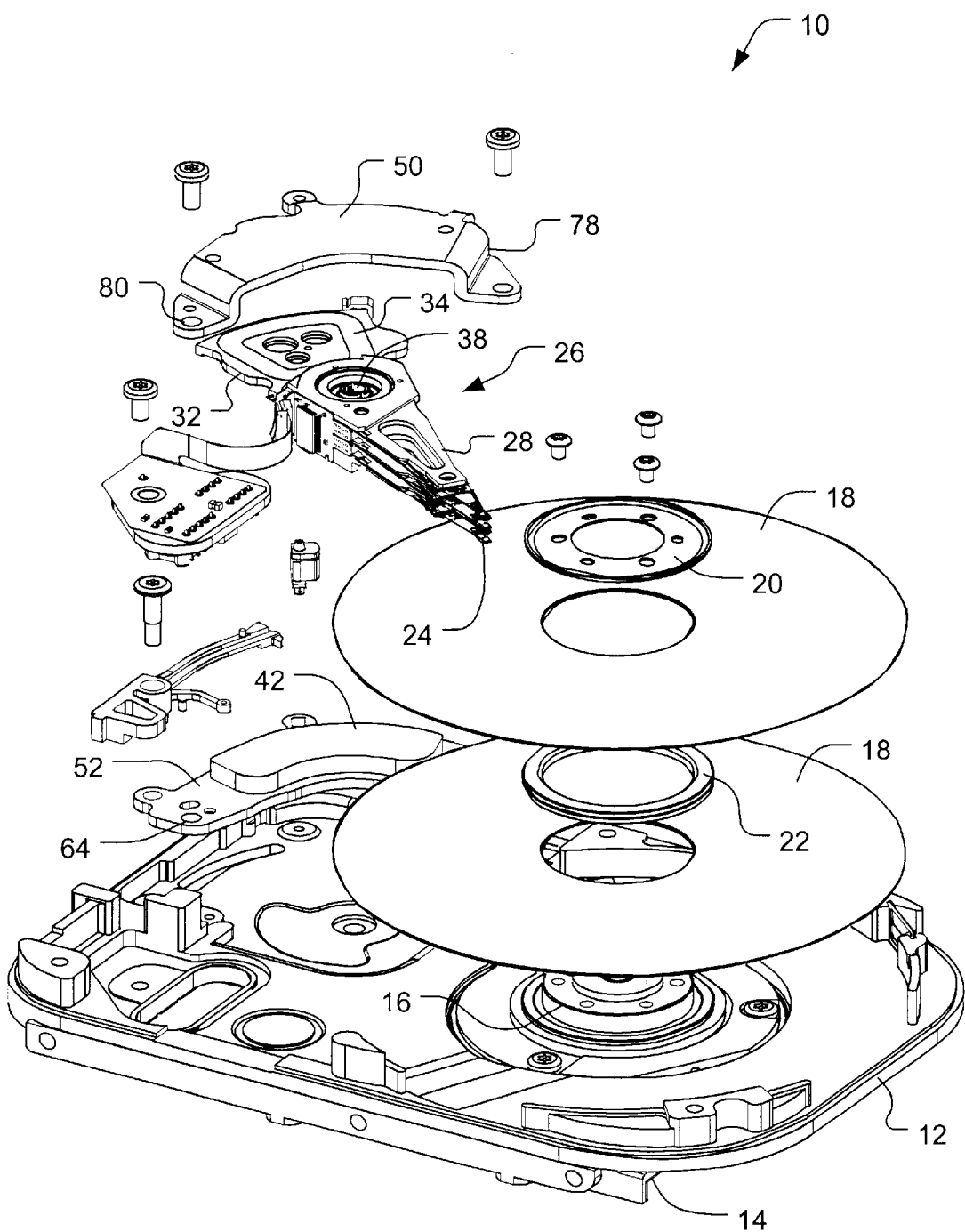
FIG. 1 is a perspective view of a disc drive.

FIG. 1 illustrates an exemplary disc drive that could be used to implement embodiments of the present invention. A disc drive 10, such as the one shown in FIG. 1, includes a base 12 and a cover (not shown), which when assembled together form a sealed environment within which various disc drive components are mounted. Disc drive controls are generally embodied in a printed circuit board assembly 14 fixed to the underside of the base 12. Part of the control circuitry drives a spindle motor 16 and thereby puts a disc stack mounted on the spindle motor 16 into rotational motion. The disc stack, having one or more discs 18, is secured to a hub of the spindle motor by a disc clamp 20. Spacers 22 may form part of the disc stack to keep the discs 18 spaced apart for access to disc surfaces by read/write devices 24.

Read/write devices 24, generally referred to as heads in this document, are supported by an actuator assembly 26 for movement across the disc surfaces. The heads 24 are usually found at the end of actuator arms 28 that extend from a pivotably mounted body 30. Fixed to the actuator assembly 26 is a support 32 to which a voice coil 34 is attached. The voice coil 34 forms part of a voice coil motor 36 responsible for imparting rotational forces to the actuator assembly 26 so that the actuator assembly 26 swings about its pivot 38 and as a result, brings the heads 24 to the desired location relative to data tracks on the disc surfaces.

Figure 2:
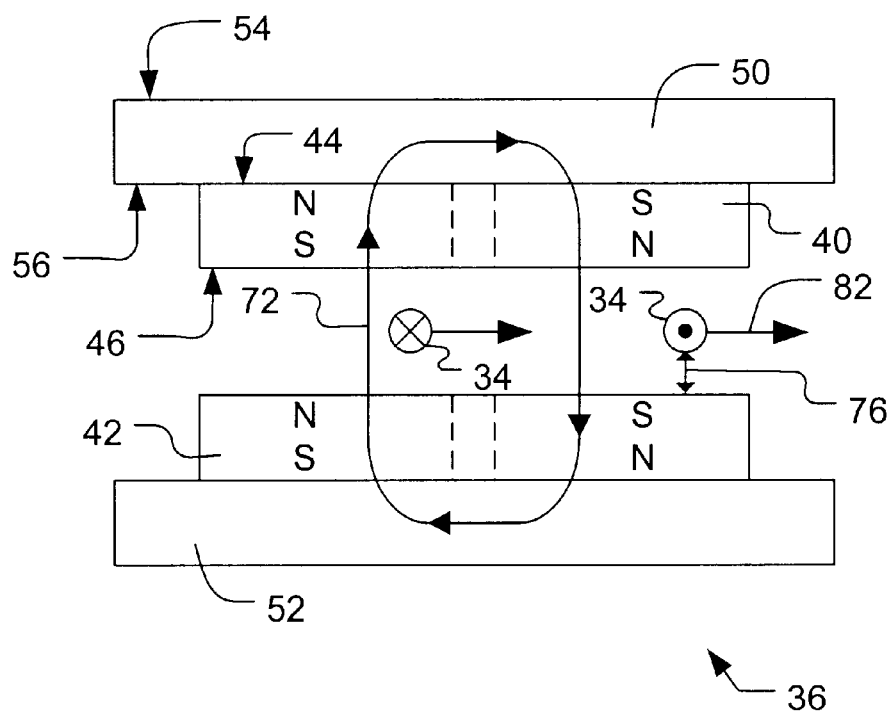
FIG. 2 is schematic diagram of a voice coil motor.

In a preferred embodiment of the present invention, the voice coil motor 36 includes a magnet assembly as well as the voice coil 34. The magnet assembly includes a top magnet 40 and a bottom magnet 42 arranged to be vertically spaced apart. Referring to FIG. 2 for a schematic diagram of the voice coil motor 36, it is shown that the voice coil 34 is located between the top magnet 40 and the bottom magnet 42. Both the top magnet 40 and the bottom magnet 42 have major surfaces 44, 46, 48, 49, substantially parallel to a plane in which the actuator assembly 26 pivots. The top magnet 40 has a direction of magnetization substantially perpendicular to its major surfaces 44, 46, and is magnetized such that half of the magnet has a top-to-bottom north-south magnetization, and the other half has a top-to-bottom south-north magnetization. The bottom magnet 42 also has a direction of magnetization that is substantially perpendicular to its major surfaces 48, 49, and is magnetized such that half of the magnet has a top-to-bottom north-south magnetization, and the other half has a top-to-bottom south-north magnetization. The top magnet 40 and the bottom magnet 42 are arranged such that on one half of the magnets, the magnetic field, as represented by the magnetic flux path 72, is directed from the bottom magnet 42 to the top magnet 40. For the other half of the magnet, the magnetic field is directed from the top magnet 40 to the bottom magnet 42. In passing a current through the voice coil 34, a force, having a direction indicated by the arrow 82, is generated.

A magnetically permeable top pole 50 and a magnetically permeable bottom pole 52 are provided to close the magnetic flux path 72. The top pole 50 and the bottom pole 52 can be essentially flat blocks of stainless steel, each having major surfaces 54, 56, 58, 60, substantially parallel to a plane in which the actuator assembly 26 pivots when in assembly in the disc drive 10. The top pole 50 is positioned above the top magnet 40. The bottom magnet 42 is fixed above the bottom pole 52. The bottom pole 52 is in turn mounted to the base 12 of the disc drive 10. For this, the bottom pole 52 is provided with features for attachment to the base 12 of the disc drive 10. In one example, shown in FIG. 7, the bottom pole 52 of the sub-assembly includes at least two through holes 64 which can be used in conjunction with fasteners such as screws for assembly to the base 12 of the disc drive 10.

Figure 3:
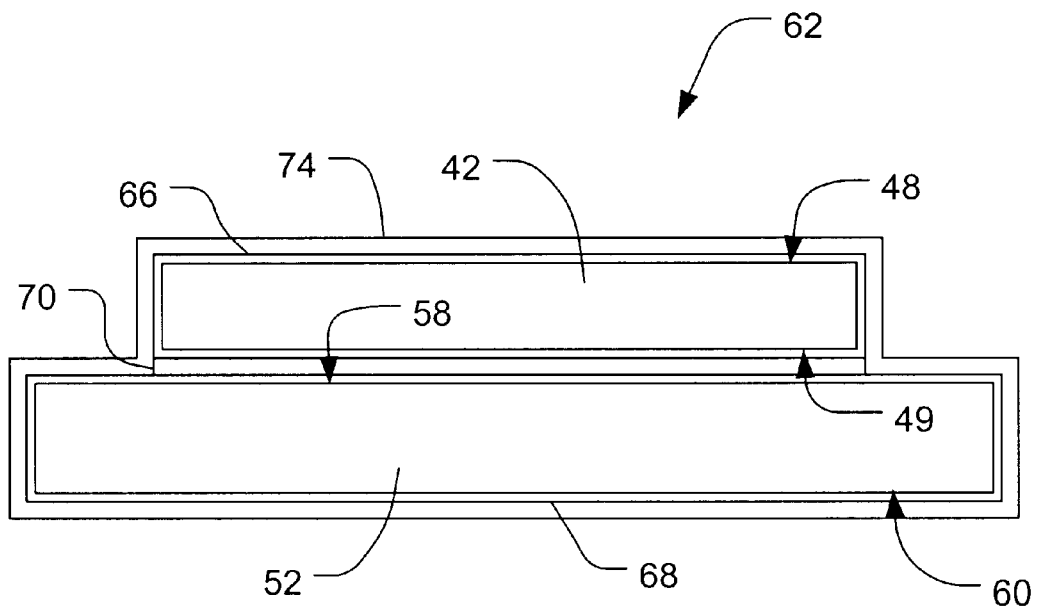
FIG. 3 is a schematic cross-section of a sub-assembly, according to a preferred embodiment of the present invention.

In making a preferred embodiment of a sub-assembly 62 of the present invention, the bottom magnet 42 and the bottom pole 52 are separately plated using zinc with yellow chromate so that they each acquire a zinc plating 66, 68. The bottom magnet 42 and bottom pole 52 are then joined together by use of an adhesive 70. Next, the bottom magnet 42 and the bottom pole 52 are placed in an appropriate mold or cast, and subjected to an overmolding process such that a sub-assembly 62 is formed. The sub-assembly 62 includes an overmold 74 of liquid crystal polymer which completely coats the bottom magnet 42 and the bottom pole 52. The sub-assembly 62 therefore has an outermost surface defined by the encapsulating overmold 74, as illustrated in FIG. 3. The overmold 74 is formed such that it is of a sufficient thickness to provide the required strength to hold the bottom magnet 42 and the bottom pole 52 together. At the same time, it is kept as thin as possible. This is because the use of an overmold over the sub-assembly may require the voice coil 34 to be positioned at a higher elevation relative to the upper surface 66 of the magnet 42. The air gap 76 between the voice coil 34 and the bottom magnet 42 is thus increased. Excessive increase in the air gap 76 may lead to an unsatisfactory decrease in the torque constant and a corresponding decrease in the efficiency of the voice coil motor. Taking these and other factors into consideration, a suitable thickness for the overmold 74 can be determined.

One advantage of the present invention is that the overmold 74 acts as a barrier to outgassing from the stainless steel core of the bottom pole 52 or from the adhesive 70 between the bottom magnet 42 and the bottom pole 52. It is therefore not necessary to involve the use of high-grade nickel plating which is a relatively expensive process. The present invention allows the use of cheaper plating materials, such as zinc with yellow chromate, giving a plating 66, 68, of zinc chromate. In addition, the overmold 74 provides a barrier against corrosion of the bottom pole 52.

Figure 4:
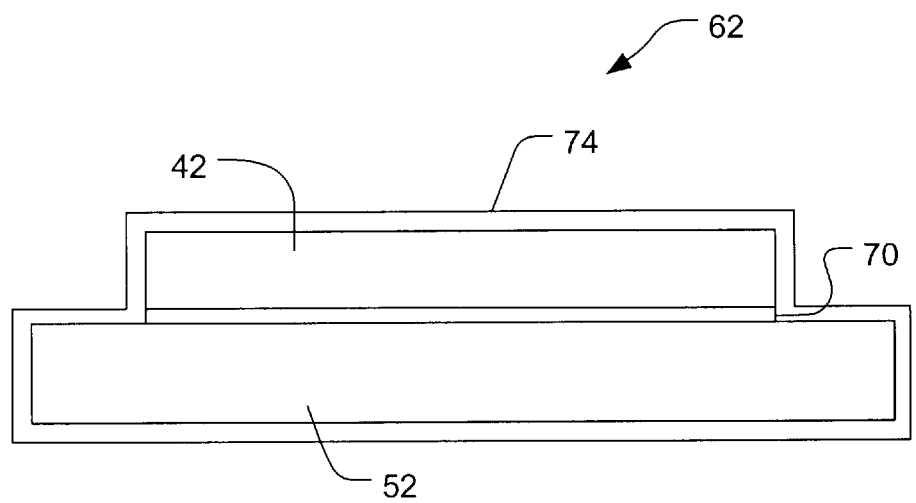
FIG. 4 is a schematic cross-section of an alternative sub-assembly.

In an alternative embodiment illustrated in FIG. 4, the bottom magnet 42 and the bottom pole 52 are joined together without first undergoing a plating process. The bottom magnet 42 and the bottom pole 52 are cleaned and an adhesive 70 is applied at the intended interface between the bottom magnet 42 and the bottom pole 52. An overmold 74 is formed over all the exposed surfaces of the bottom magnet 42 and the bottom pole 52 such that the resultant sub-assembly 62 has a continuous surface defined by the overmold 74.

Figure 5:
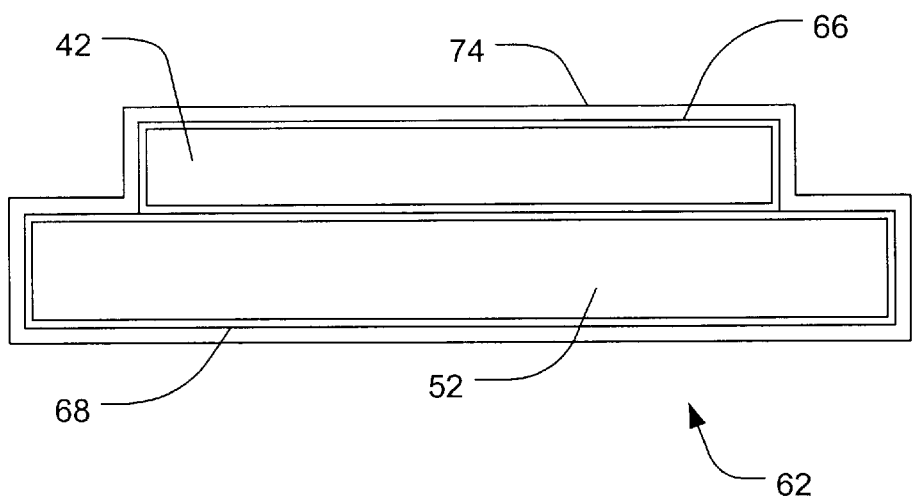
FIG. 5 is a schematic cross-section of another sub-assembly.
Figure 6:
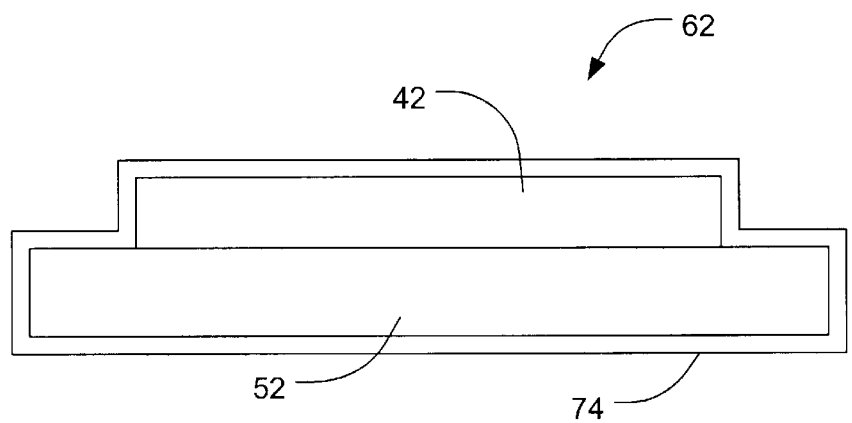
FIG. 6 is a schematic cross-section of yet another embodiment of the present invention.

FIG. 5 shows yet another embodiment of the present invention. The bottom magnet 42 and the bottom pole 52 are arranged adjacent to each other and an overmold 74 is introduced to completely enclose the bottom magnet 42 and the bottom pole 52. One advantage of this embodiment is that the sub-assembly 62 can be produced without the need to undergo a lengthy baking cycle that is typically required when an adhesive is used. The overmold 74 is formed such that it provides sufficient strength to hold the bottom magnet 42 and the bottom pole 52 together. By not using adhesive, the risk of outgassing and contamination is also reduced. Alternatively, the preliminary plating process can be done away with such that an unplated bottom magnet 42 and an unplated bottom pole 52 are overmolded to form an integrated unit, resulting in the sub-assembly 62 shown in FIG. 6.

The foregoing description has been made with reference to a sub-assembly of a bottom magnet and a bottom pole. It will be understood that the invention can be applied equally to a top magnet and a top pole.

Figure 7:
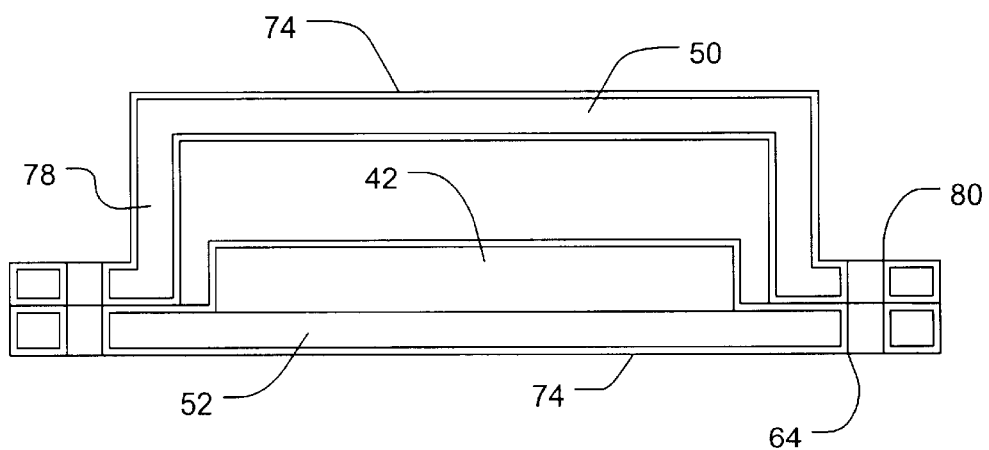
FIG. 7 is a schematic cross-section showing a top pole arranged for assembly to a bottom pole.

In some disc drives, the voice coil motor does not include a top magnet. A top pole 50 with standoffs 78 is provided to close the magnetic flux path 72. The standoffs 78 include through holes 80 for receiving fasteners, such as screws, for assembly to the bottom pole. In such an example, as shown in FIG. 7, the top pole 50 can be overmolded to provide the required barrier to outgassing and to avoid the use of expensive nickel plating. The present invention is thus not limited to a system having the specific magnetic flux pattern described above. The present invention can be applied in conjunction with a variety of disc drive designs.

Preferred embodiments of the present invention may be alternatively described as follows:

In a disc drive 10, a voice coil motor 36 includes a magnet 42 having a magnetic field 72 and a pole 52 adjacent the magnet 42 to direct the magnetic field 72. The voice coil motor 36 also includes a coil 34 in the magnetic field 72. There is provided an overmold 74 encapsulating the magnet 42 and the pole 52. In one embodiment, the overmold 74 is a liquid crystal polymer. In another embodiment, the overmold 74 is a polyphenylene sulphide. The magnet 42 and the pole 52 may optionally be joined by an adhesive 70. Preferably, the pole 52 is covered by a first plating layer 68 which is interior to the overmold 74. The magnet 42 may be covered by a second plating layer 66 interior to the overmold 74. In one embodiment, the first plating layer 68 and the second plating layer 66 each consists essentially of zinc chromate. In another embodiment, the first plating layer 68 and the second plating layer 66 each consists essentially of nickel.

It is to be understood that even though numerous characteristics and advantages of various embodiments of the present invention have been set forth in the foregoing description, together with details of the structure and function of various embodiments of the invention, this disclosure is illustrative only. For example, the material that is chosen for the overmold is not limited to liquid crystal polymer. An alternative material that may be used for the overmold is polyphenylene sulphide. The choice of other suitable materials is not intended to be precluded by the examples given in this disclosure. Similarly, an alternative lower grade plating material that can be used is electroless nickel with medium phosphorus, thus giving a plating of nickel. Changes may therefore be made in detail, especially in matters of materials, structure and arrangement of parts without departing from the scope and spirit of the present invention. In addition, although the preferred embodiment described is directed to a magnet and pole sub-assembly for a disc drive, it will be appreciated by one skilled in the art that the teachings of the present invention can be applied to other systems without departing from the scope and spirit of the present invention.

What is claimed is:

1. A magnet assembly comprising:
   a first magnet;
   a first pole having a contact surface, the contact surface contacting and extending beyond a periphery of the first magnet;
   a second pole spaced from the first pole; and
   a first overmold encapsulating the first magnet and the first pole but not the second pole.

2. An assembly of claim 1 wherein the first overmold comprises a liquid crystal polymer.

3. An assembly of claim 1 wherein the first overmold comprises a polyphenylene sulphide.

4. An assembly of claim 1 further comprising an adhesive joining the first magnet to the first pole.

5. An assembly of claim 1 wherein at least one of the first pole and the first magnet is covered by a plating layer.

6. An assembly of claim 5 wherein the plating layer comprises at least one of the group consisting of zinc chromate and nickel.

7. The assembly of claim 1, further comprising:
   a second overmold encapsulating the second pole.

8. The assembly of claim 7, further comprising:
   a second magnet encapsulated by the second overmold.

9. The assembly of claim 1, further comprising:
   a spacer for spacing the second pole from the first pole, the spacer being encapsulated by one of the first and second overmolds.

10. The assembly of claim 9, in which the spacer is integrally formed with one of the first and second poles.

11. A disc drive comprising:
    a voice coil motor comprising:
      a first magnet having a magnetic field;
      a first pole having a contact surface contacting the first magnet and configured to direct the magnetic field;
      a spacer for spacing a second pole from the first pole, the spacer overlying the first pole upper surface;
      a coil in the magnetic field; and
      a first overmold encapsulating the first magnet and the first pole but not the spacer.

12. A disc drive of claim 11, wherein the first overmold is a liquid crystal polymer.

13. A disc drive of claim 11 wherein the first overmold is a polyphenylene sulphide.

14. A disc drive of claim 11 further comprising an adhesive joining the first magnet to the first pole.

15. An assembly of claim 11 wherein at least one of the first pole and magnet is covered by a plating layer.

16. An assembly of claim 15 wherein the plating layer comprises at least one of the group consisting of zinc chromate and nickel.

17. The assembly of claim 11, further comprising:
    a second pole spaced from the first pole; and
    a second overmold encapsulating the second pole.

18. The assembly of claim 17, further comprising:
    a second magnet encapsulated by the second overmold.

19. The assembly of claim 17, in which the spacer is encapsulated by the second overmold.

20. The assembly of claim 11, in which the spacer is integrally formed with the second pole.

21. An assembly for use in a disc drive, the assembly comprising:
    a magnet;
    a pole adjacent the magnet;
    an adhesive joining the magnet to the pole; and
    an overmold encapsulating the magnet and the pole.

* * * * *